United States Patent
Tolbert, Jr.

(10) Patent No.: US 6,616,416 B1
(45) Date of Patent: Sep. 9, 2003

(54) METHODS AND SYSTEM FOR MOTOR OPTIMIZATION USING CAPACITANCE AND/OR VOLTAGE ADJUSTMENTS

(75) Inventor: John W. Tolbert, Jr., Bristol, TN (US)

(73) Assignee: Bristol Compressors, Inc., Bristol, VA (US)

( * ) Notice: Subject to any disclaimer, the term of this patent is extended or adjusted under 35 U.S.C. 154(b) by 0 days.

(21) Appl. No.: 10/076,544

(22) Filed: Feb. 19, 2002

(51) Int. Cl.⁷ .................... F04B 49/00; F04B 49/06; F04B 19/24; H02P 1/26
(52) U.S. Cl. .................... 417/45; 417/44.1; 417/53; 318/794
(58) Field of Search .................... 417/44.1, 45, 44.2, 417/44.11, 274, 53; 62/228.5; 318/794, 795; 323/299, 369

(56) References Cited

U.S. PATENT DOCUMENTS

| | | | |
|---|---|---|---|
| 2,519,562 A | 8/1950 | Glass et al. | |
| 2,914,637 A | * 11/1959 | Wuerth | 337/103 |
| 3,855,509 A | 12/1974 | Wright | |
| 4,020,402 A | 4/1977 | Storm | |
| 4,052,648 A | 10/1977 | Nola | |
| 4,137,488 A | 1/1979 | Sibalis | |
| 4,160,196 A | 7/1979 | Ismatkhodzhaev et al. | |
| 4,409,532 A | 10/1983 | Hollenbeck et al. | |
| 4,581,900 A | * 4/1986 | Lowe et al. | 62/228.1 |
| 4,642,545 A | 2/1987 | Lewus | |
| 4,672,284 A | 6/1987 | Ward | |
| 5,075,611 A | 12/1991 | Ankele | |
| 5,293,108 A | 3/1994 | Spudich | |
| 5,385,029 A | * 1/1995 | Yamanaka et al. | 62/133 |
| 5,404,088 A | 4/1995 | Nanos | |
| 5,585,708 A | 12/1996 | Richardson et al. | |
| 5,632,155 A | * 5/1997 | Sugiyama et al. | 62/179 |
| 5,821,726 A | 10/1998 | Anderson | |
| 5,883,490 A | 3/1999 | Moriera | |
| 5,892,349 A | 4/1999 | Bogwicz et al. | |
| 6,040,679 A | * 3/2000 | Monk et al. | 318/778 |
| 6,318,966 B1 | * 11/2001 | Madara et al. | 417/12 |

* cited by examiner

Primary Examiner—Charles G. Freay
Assistant Examiner—Timothy P. Solak
(74) Attorney, Agent, or Firm—Brian T. Sattizahn; McNees Wallace & Nurick LLC (57) ABSTRACT

A system and method for controlling a variable capacity compressor driven by a motor. Preferably, said system and method are used with a reversible, two-stage compressor motor. In one embodiment, the method includes, for example, operating the variable capacity compressor at a first capacity to satisfy a demand for heating or cooling; detecting a change in the demand for heating or cooling; operating the variable capacity compressor at a second, different capacity based on the detected change in demand; detecting an operating parameter that can indicate an opportunity to increase compressor efficiency when the compressor is operating at a given capacity; and varying the torque applied by the motor when the detected operating parameter indicates an opportunity to increase efficiency of the compressor by varying the torque.

25 Claims, 5 Drawing Sheets

METHODS AND SYSTEM FOR MOTOR OPTIMIZATION USING CAPACITANCE AND/OR VOLTAGE ADJUSTMENTS

BACKGROUND OF THE INVENTION

I. Field of Invention

The present invention is directed to a heating, ventilation, and air-conditioning system and more particularly relates to a method and system for optimizing the torque of a compressor motor by varying at least one of a voltage or a capacitance.

II. Description of the Related Art

Conventional single-phase alternating current induction motors for driving compressors are connected to a source of power by a line contactor. Electric motors typically include a stator, which is wound with a start winding and run winding connected to the source of power. The stator winding surrounds the motor, which rotates a shaft to produce the motor output. In circuit with the run winding and the start winding are, if required, a run capacitor and a start capacitor, respectively. Start capacitors is usually sized for a capacitance that is appropriate for starting the compressor while a run capacitor is usually sized for a capacitance that is appropriate for the maximum running torque of the compressor.

In capacitor start motors, start circuits are connected in parallel with a run winding of each speed of the multi-speed motor. The start circuits include a start winding which is connected in series with start capacitors. During a motor start, both the run winding and the start winding are connected across the motor's power source to magnetically excite the rotor and cause rotation. The start winding and start capacitor combination is used to provide the high torque required during typical start conditions.

With past approaches, conventional motors for driving compressors provide more than enough torque to satisfy the demands of the compressor. With variable capacity compressors, the motor driving the compressor may significantly vary torque. For example, in a two-stage, reversible compressor, the motor may provide a large amount of torque in a second stage of operation and a lesser amount of torque in the first stage of operation. However, although past approaches significantly varied the capacity of the compressor, past approaches failed to optimize the torque of the compressor motor for a given load, resulting in inefficient operation of the compressor.

SUMMARY OF THE INVENTION

Accordingly, the present invention is directed to motor optimization by varying at least one of a voltage and a capacitance based on changing demands for heating or cooling. Moreover, the present invention is directed to motor optimization of a two-stage compressor that operates in a second stage when the motor rotates in one direction and operates in a first stage when the motor rotates in the reverse direction.

An object of advantage of the present invention is to provide an improved system and method of operating a compressor motor that minimizes one or more of the limitations and disadvantages of the presently available systems and methods for such compressor motors and heating, ventilation, and air conditioning (hereinbelow HVAC) systems.

Additional features and advantages of the invention will be set forth in part in the description which follows and in part will be obvious from the description, or may be learned by practice of the invention. The objectives and advantages of the invention may be realized and attained by the systems and methods particularly pointed out in the written description and claims hereof as well as the appended drawings.

To achieve these and other advantages and in accordance with the purpose of the invention, as embodied and broadly described herein, there is provided a method for controlling a two-stage, reversible compressor, such as the Bristol Twin Single compressor. Compressors of this type and their use and application are explained in detail in U.S. patent application Ser. No. 09/133,841, filed on Aug. 13, 1998, now U.S. Pat. No. 6,132,177 and entitled "Two Stage Reciprocating Compressors and Associated HVAC Systems and Methods," and in U.S. patent application Ser. No. 09/235,288, having a filing date of Jan. 22, 1999, now U.S. Pat. No. 6,217,287 and entitled Variable Capacity Compressor Having Adjustable Crankpin Throw Structure, both of which applications are hereby incorporated by reference. Such compressors operate at a first stage when the motor rotates in one direction and at a second stage when the motor rotates in a reverse direction. By means of example, such a compressor with two cylinders may reciprocate the pistons in both cylinders at one stage and will reciprocate only one piston at the other stage. Such a compressor having only a single cylinder will reciprocate the piston at full stroke when the motor rotates in one direction and at a lesser stroke (e.g., a half stroke) when the motor rotates in the other direction.

The method of controlling a variable capacity compressor driven by a motor. The method including, for example, operating the variable capacity compressor at a first capacity to satisfy a demand for heating or cooling; detecting a change in the demand for heating or cooling; operating the variable capacity compressor at a second, different capacity based on the detected change in demand; detecting an operating parameter that can indicate an opportunity to increase compressor efficiency when the compressor is operating at a given capacity; and varying the torque applied by the motor when the detected operating parameter indicates an opportunity to increase efficiency of the compressor by varying the torque.

Moreover, in another embodiment, there is provided a system for controlling a variable capacity compressor including a start winding and a run winding, including, means for operating the variable capacity compressor in one or more stages such that the power is provided by the variable capacity compressor to satisfy a demand for heating or cooling; means for detecting a change in the demand for heating or cooling; means for operating the variable capacity compressor at a reduced capacity based on the detected change; and means for varying one of a voltage applied to the variable capacity compressor or a capacitance connected in parallel with a run capacitor, such that the torque provided to the variable capacity compressor varies to increase the efficiency of the compressor.

In still another embodiment, there is provided a system for controlling a variable capacity compressor including a start winding and a run winding, including, for example, a sensor for detecting an indication of a change in the demand for heating or cooling; a controller further including means for operating the variable capacity compressor in one or more stages such that the power is provided by the variable capacity compressor to satisfy a demand for heating or cooling, and means for operating the variable capacity compressor at a reduced capacity based on the detected change. Moreover, the system includes a first relay and a second relay connected to the controller, such that the first and second relays may vary a capacitance connected in parallel with a run capacitor, wherein the torque provided to the variable capacity compressor varies to increase the efficiency of the compressor.

In yet another embodiment, there is provided a computer readable medium containing computer software, which, when run on a computer causes the computer to provide apparatus for controlling a variable capacity compressor including a start winding and a run winding. The apparatus includes, for example, means for operating the variable capacity compressor in one or more stages such that the power is provided by the variable capacity compressor to satisfy a demand for heating or cooling; means for detecting a change in the demand for heating or cooling; means for operating the variable capacity compressor at a reduced capacity based on the detected change; and means for varying one of a voltage applied to the variable capacity compressor or a capacitance connected in parallel with a run capacitor, such that the torque provided to the variable capacity compressor varies to increase the efficiency of the compressor.

Moreover, in an embodiment, there is provided a system for controlling a variable capacity compressor including a start winding and a run winding, the system including at least one memory including, for example, code that operates to control the variable capacity compressor in one or more stages such that the power is provided by the variable capacity compressor to satisfy a demand for heating or cooling, code that detects a change in the demand for heating or cooling, code that operates the variable capacity compressor at a reduced capacity based on the detected change, and code that varies one of a voltage applied to the variable capacity compressor or a capacitance connected in parallel with a run capacitor, such that the torque provided to the variable capacity compressor varies to increase the efficiency of the compressor. Moreover, the system includes at least one processor that executes the code.

Furthermore, in still another embodiment, there is provided a system of controlling a two-stage reversible compressor including a start winding and a run winding, including, for example, means for operating the variable capacity compressor in one or more stages such that the power is provided by the variable capacity compressor to satisfy a demand for heating or cooling; means for detecting a change in the demand for heating or cooling; means for operating the variable capacity compressor at a reduced capacity based on the detected change; and means for varying a capacitance connected in parallel with a run capacitor, such that the torque provided to the variable capacity compressor varies to increase the efficiency of the compressor.

It is to be understood that both the foregoing general description and the following detailed description are exemplary and explanatory only and are not restrictive of the invention, as described.

BRIEF DESCRIPTION OF THE DRAWINGS

The accompanying drawings, which are incorporated in and constitute a part of this specification, illustrate an embodiment of the invention and, together with the description, serve to explain the objects, advantages and principles of the invention. In the drawings.

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1A:
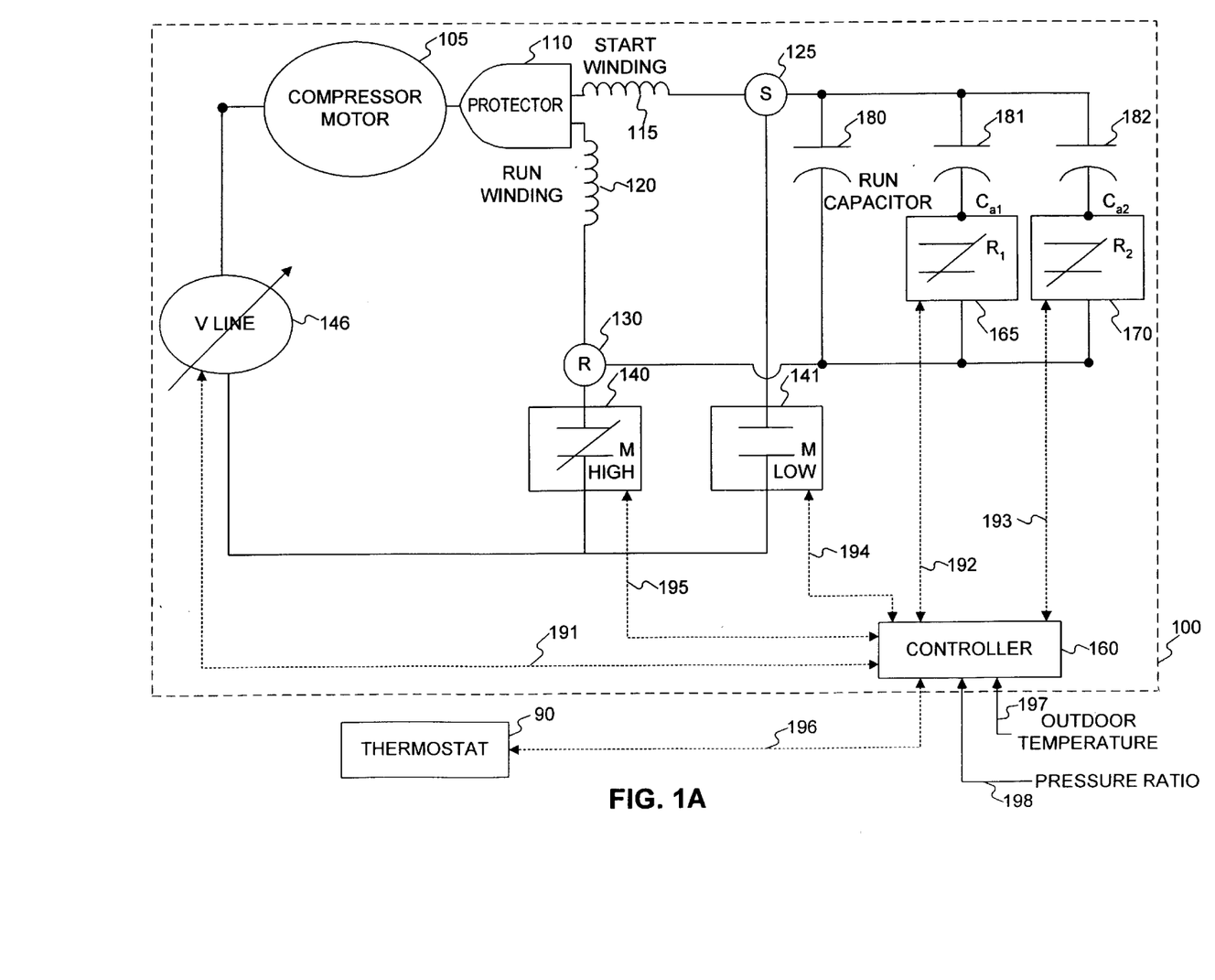
FIG. 1A illustrates an exemplary wiring scheme for varying at least one of a voltage and/or a capacitance for a compressor motor in accordance with methods and systems consistent with the present invention.

FIG. 1A illustrates an exemplary system capable of executing the steps associated with controlling a compressor by varying at least one of a voltage and/or a capacitance. As shown in FIG. 1A, the system 100 includes a variable source of line voltage ($V_{Line}$) 146, a compressor motor 105, a protection circuit 110, a run winding 120, a start winding 115, a run terminal 130, a start terminal 125, a first contactor ($M_{High}$) 140, a second contactor ($M_{Low}$) 141, a run capacitor 180, one or more auxiliary capacitors ($C_{a1}$, $C_{a2}$) 181, 182, one or more relays ($R_1$ and $R_2$) 165, 170 for the auxiliary capacitors, a controller 160, and one or more control lines 191–195.

The variable source of line voltage ($V_{Line}$) 146 may include a voltage source capable of providing an alternating current (AC) that may be varied in magnitude and/or phase. In one embodiment, the variable source of line voltage 146 may vary the AC voltage between 100 volts and 220 volts based on a control signal provided by the controller 160 and control line 191. Variable sources of line voltage 146 are known and are commercially available, and any such variable system can be applied to the system 100. Alternatively, the variable source of line voltage 145 may vary the magnitude of the AC voltage based on the control signal provided by the controller 160 and control line 191 by adding one or more resistors to reduce the voltage by a predetermined amount (e.g., reducing the voltage by about 10%).

Figure 1B:
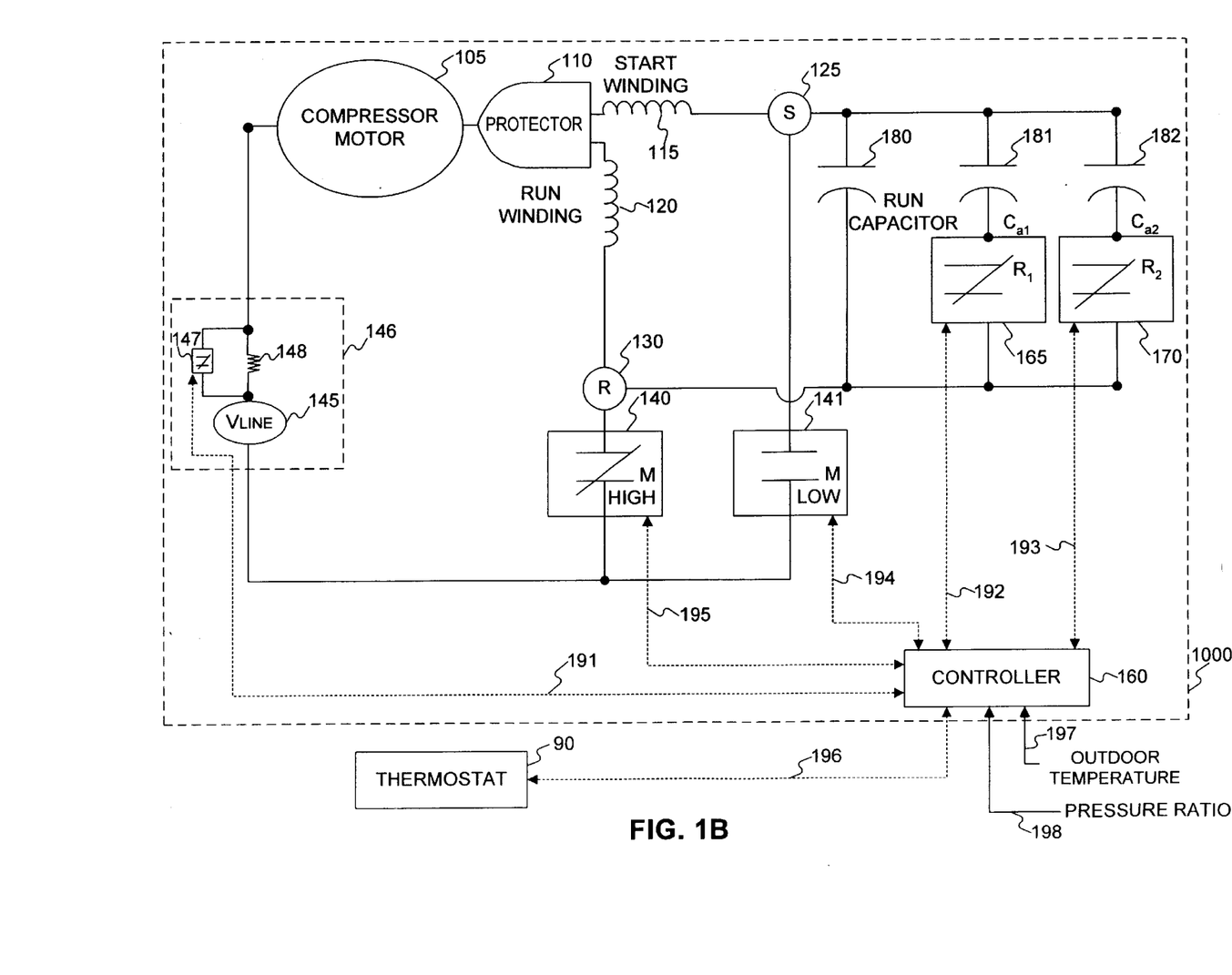
FIG. 1B illustrates another exemplary wiring scheme for varying at least one of a voltage and/or a capacitance for a compressor motor in accordance with methods and systems consistent with the present invention.

FIG. 1B shows another exemplary system 1000 capable of executing the steps associated with controlling a compressor by varying at least one of a voltage and/or a capacitance. Referring to FIG. 1B, the system 1000 is similar to the system 100 of FIG. 1A. However, the system 1000 of FIG. 1B includes an exemplary variable source of line voltage 146 that includes a voltage source 145, a resistor 148, and a relay 147. The variable source of line voltage 146 may reduce the output voltage when a control signal from control line 191 and controller 160 open the relay 147, connecting the resistor 148 in series with the voltage source 145. The resistor 148 may be a fixed resistor selected to reduce the voltage by a predetermined amount, such as about 10%. Although FIG. 1B shows a resistor 148, a skilled artisan would recognize that the resistor 148 may be embodied with any device that provides a resistance or an impedance.

The compressor may include the compressor motor 105, the protection circuit 110 for providing motor protection, the run winding 120, the start winding 115, the start terminal 125, and the run terminal 162. The protection circuit 110 may protect the motor windings from damage associated with heat or current. In one embodiment, the protection circuit 110 is similar to the protection circuit described in U.S. Pat. No. 6,132,177, entitled "Two Stage Reciprocating Compressors and Associated HVAC Systems and Methods," which is expressly incorporated above by reference in its entirety.

The compressor motor 105 may be a motor for a variable capacity compressor, to be used with or without associated HVAC components. In one embodiment of the present invention, the compressor motor 105 may be a reversible, compressor motor for a reciprocating, two-stage compressor that operates at a second stage, when rotated in one direction, and at a first stage, when operated in the reverse direction. For example, the two-stage, reversible compressor may include the Bristol Twin Single compressor. In one embodiment, the compressor motor 105 for a given compressor is designed to match the full load capacity of the compressor when it is rotated in the forward direction and the partial load capacity when run in the opposite direction. In that embodiment, the motor operates on the run windings when it operates at full load capacity and on the start winding when it operates at partial or reduced load capacity.

Referring again to FIG. 1A, the first contactor ($M_{High}$) 140 and the second contactor ($M_{Low}$) 141 open or close an electrical connection based on a control signal from the electronic controller 160. The first contactor 140 is electrically connected to the run terminal 130, the run winding 120, the run capacitor 180, and the variable source of line voltage 146. On the other hand, the second contactor 141 is electrically connected to the start terminal 125, the start winding 115, and the variable source of line voltage 146. The first contactor ($M_{High}$) 140 and second contactor ($M_{Low}$) 141 may be implemented with devices, such as single pole switches or relays, which are inexpensive and commercially available. Preferably, the first contactor 140 and the second contactor 141 are rated to satisfy the maximum anticipated current. Moreover, although FIG. 1A depicts the first contactor 140 as a normally closed contactor and the second contactor 141 as a normally open contactor, a skilled artisan would recognize that a normally open and a normally closed contactor may, respectively, be used instead.

In one embodiment, the compressor motor 105 may operate on the run windings 120 when it is rotated in one direction, such as the forward direction, and may operate on the start windings 115 when it is rotated in the opposite direction. The compressor motor 105 may operate at a first load associated with the maximum load of the compressor when operated in the forward direction (e.g., using both cylinders or using a full stroke) and at a second reduced load when operated in the reverse direction (e.g., using a single cylinder or using a half stroke).

When the first contactor ($M_{High}$) 140 is closed and the second contactor ($M_{Low}$) 141 is open, as shown in FIG. 1A, the compressor motor 105 may operate in a second stage using the run winding 120 as the main winding and place the start winding 115 in series with one or more capacitors, such as with the parallel combination of the run capacitor 180 and the auxiliary capacitors ($C_{a1}$, $Ca_2$) 181, 182.

When the compressor motor 105 operates in a first-stage (or lower capacity stage), the compressor motor 105 may run in reverse. In the first-stage, a second contactor ($M_{Low}$) 141 is energized (i.e., closed) and the first contactor ($M_{High}$) 140 is opened. The compressor motor 105 may then run using the start winding 115 as the main winding and place the run winding 120 in series with one or more capacitors (e.g., the parallel combination of the run capacitor 180 and the auxiliary capacitors 181, 182).

The run capacitor 180 may include one or more capacitors that are rated to satisfy the maximum anticipated current during switching. In one embodiment, the sum of the run capacitor 180 and the auxiliary capacitors ($C_{a1}$, $Ca_2$) 181, 182 may be sufficient for the compressor operating at a full load. For example, in some applications (e.g., a 3 ton (36,000 BTU/hour) compressor with a 3 horsepower motor), the sum of the capacitance for the run capacitor 180 and the auxiliary capacitors ($C_{a1}$, $Ca_2$) 181, 182 may in the range of about 25 microfarads to about 55 microfarads.

The auxiliary capacitors 181, 182 include one or more capacitors configured in parallel with the run capacitor 180. In one embodiment, the controller 160 may determine when to connect or disconnect each of the one or more auxiliary capacitors 181, 182 by controlling the one or more relays 165, 170 to close or open. Although two auxiliary capacitors 181, 182 are shown in FIG. 1A, a skilled artisan would recognize that a single capacitor or more than two capacitors may also be used instead. Alternatively, the one or more auxiliary capacitors 181, 182 may include a variable capacitor that may be controlled by the controller 160. By means of example only, in the exemplary embodiment described above, each of the auxiliary capacitors were rated at 5 microfarads of capacitance.

The one or more relays ($R_1$ and $R_2$) 165, 170 may include a coil and one or more contactors. The relays 165, 170 may each be controlled to open and close based on the control signal provided by the controller 160. For example, the controller 160 may provide the control signal to the first relay 165 through a control line, such as control line 192. The control signal may thus toggle the first relay 165 open or closed to disconnect or connect the first auxiliary capacitor 181.

Although the relays 165, 170 may be of the normally closed type, as shown in FIG. 1A, a skilled artisan would recognize that normally open relays may be used instead. Moreover, the relays 165, 170 may be rated to satisfy the average current during normal operation of the compressor motor 105. The relays ($R_1$ and $R_2$) 165, 170 may be implemented with devices similar to the contactors 140, 141 (e.g., with single pole switches or relays), which are inexpensive and commercially available. Although FIG. 1 depicts relays 165, 170, a skilled artisan would now recognize that any other device for controlling the flow of current through a circuit may be used instead including, for example, a Triac or a varistor.

The controller 160 may be implemented with a variety of logic devices, components, subsystems, and systems capable of controlling various devices and components associated with the system 100. Furthermore, the controller 160 may include a data processor (not shown) or a set of data processors to perform the functions of controlling the strength (or torque) of the compressor motor by varying at least one of the source of the line voltage 146 and/or the capacitance. For example, the controller 160 may vary the capacitance by opening or closing the relays 165, 170 and thus add or remove the auxiliary capacitors 181, 182. Moreover, the controller 160 may also include, for example, one or more of the following additional components: one or more central processing units, a co-processor, memory, storage, registers, an input device, an output device, and/or other data processing devices and systems as appropriate.

The controller 160 may provide and/or receive control signals on control lines 191–196. For example, the controller 160 may provide control signals on control lines 192–195 to open or close the relays 165, 170 or switches 140, 141. The controller 160 may also provide a control signal on control line 191 to control the variable source of line voltage 146. Although FIG. 1A shows each of control lines 191–196 as a bi-directional control line, a skilled artisan would recognize that a unidirectional control line may be used instead.

The controller 160 may receive an indication of the outdoor ambient temperature 197 from a temperature sensor (e.g., thermostat) and may also receive an indication of the pressure ratio for the compressor. The pressure ratio 198 for a compressor is the ratio of the suction pressure measured at the input of a compressor (not shown) over the discharge pressure measured at the output of the compressor. These pressures may be measured by a pressure sensor.

Further, the controller 160 may be connected to or collocated with a device (or sensor) that measures temperature, humidity, and/or pressure (e.g., a thermostat 90, a humidity sensor, and/or a pressure sensor). The device may indicate changes in the demand for heating or cooling based upon, for example, temperature, humidity, or pressure. In one embodiment, the controller 160 may control the thermostat 90 and/or receive information, such as indoor ambient temperature, through control line 196. Alternatively, the controller 160 may be integrated with the thermostat 90. The controller 160 and/or any of the above components may be embodied in any suitable combination of hardware, software, or firmware and may be embodied as a separate system or incorporated into another device. Although thermostat 90 may provide an indication of indoor ambient temperature, thermostat 90 may also provide an indication of outdoor ambient temperature (e.g., outdoor temperature 197).

Figure 2:
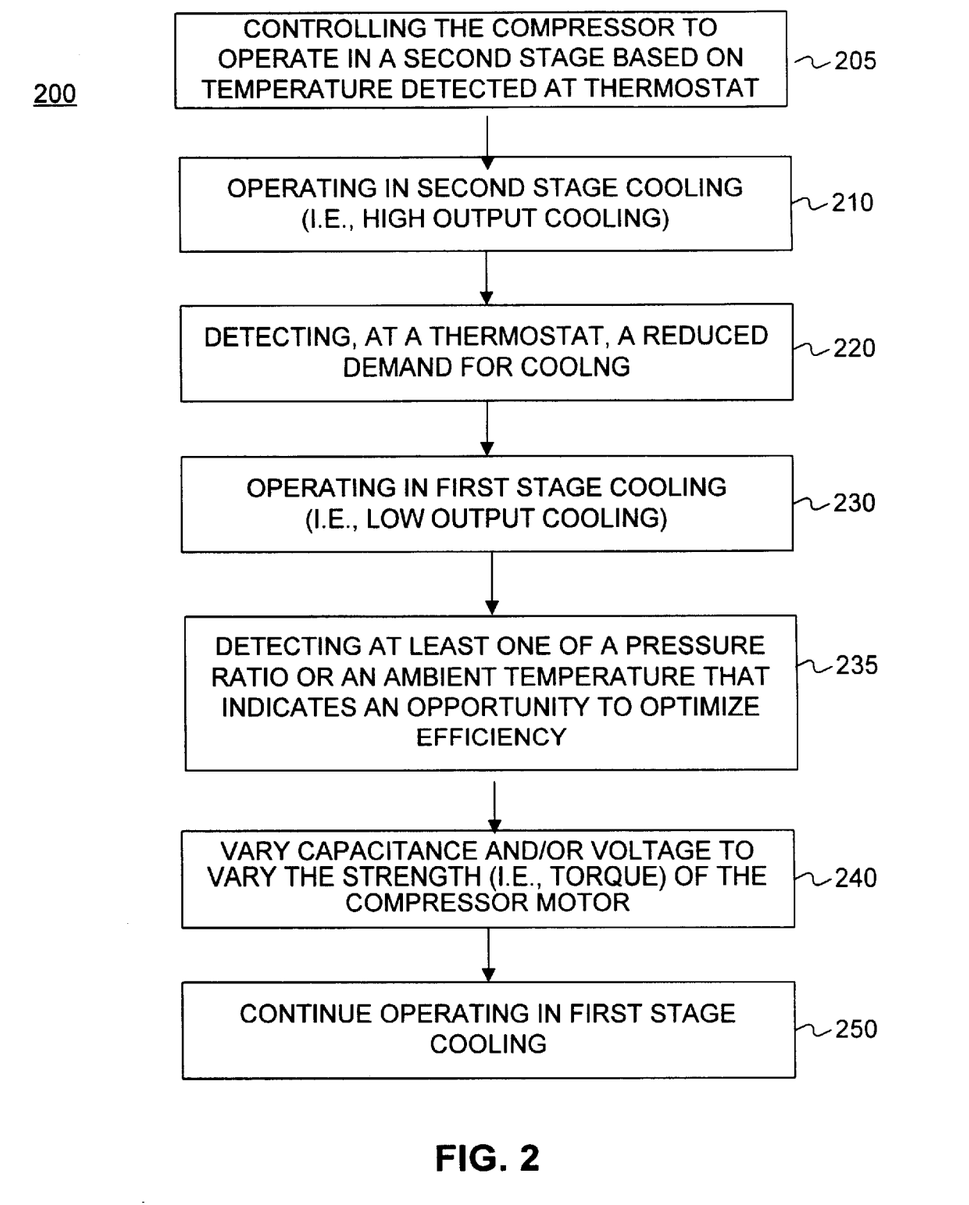
FIG. 2 is an exemplary flowchart depicting steps associated with controlling a two-stage reversible compressor that provides cooling in accordance with methods and systems consistent with the present invention.

FIG. 2 shows an exemplary flowchart depicting the steps associated with varying at least one of the capacitance and/or the voltage. Referring to FIGS. 1A and 2, the controller 160 may control compressor 105 to operate in a second stage (or full capacity cooling) based on a detected temperature at the thermostat 90 (step 205). The compressor motor 105 may then operate in a second stage of cooling, providing full capacity cooling (step 210). When the thermostat 90 detects a reduced demand for cooling (step 220), the controller 160 may control the compressor motor 105 to run in a lower capacity first stage of cooling (step 230); detect at least one of a pressure ratio or an ambient temperature indicating an opportunity to optimize efficiency (step 235); and vary at least one of the capacitance or the voltage (step 240) to adjust the compressor motor 105 strength. The compressor motor 105 may then continue operating in the first stage of cooling (step 250).

To control compressor 105 to operate in a second stage (or full capacity cooling) based on a detected temperature at the thermostat 90 (step 205), the controller 160 may receive indications through control line 196 of an indoor ambient temperature and a desired temperature setting. These indications may permit the controller 160 and/or thermostat 90 to determine that the demand for cooling may require the full cooling capacity of the compressor motor 105. For example, if the thermostat 90 indicates an indoor ambient temperature of 80° Fahrenheit (F) and a desired temperature setting of 70° F., the controller 160 may control the compressor 105 to operate in a second stage to provide full capacity cooling.

To operate in a second stage of cooling (step 210), the compressor motor 105, as noted above, may operate using two cylinders, providing sufficient torque to satisfy the demand for full capacity cooling. The controller 160 may provide on control lines 194, 195 control signals that close the first contactor 140 and open the second contactor 141.

The thermostat 90 and/or controller 160 may detect a reduced demand for cooling (step 220) based on environmental conditions, such as temperature and/or humidity. In one embodiment, the controller 160 may receive an indication from an outdoor temperature sensor 197 that the outdoor temperature has decreased, reducing the need for cooling. The controller 160 may alternatively receive indications from the indoor thermostat 90 that the demand for cooling has decreased. For example, the thermostat 90 may indicate an indoor ambient temperature of about 74° F. and a desired temperature setting of about 70° F., indicating a reduced demand for cooling.

When the demand for cooling decreases, the compressor motor 105 may operate in a reduced first stage of cooling (step 230). To operate in a reduced first stage of cooling, the controller 160 may open the first contactor 140 and close the second contactor 141 by providing a control signal on each of the control lines 194, 195. Moreover, in one embodiment, the compressor motor 105 may operate in the reduced first-stage of cooling (step 230) by operating in reverse.

When the compressor motor 105 operates in a lower first stage, the controller 160 may determine an opportunity to enhance operating efficiency (step 235). For example, to determine an opportunity to enhance operating efficiency, the controller 160 may receive at least one of a pressure ratio or an ambient temperature (step 235). The controller 160 may then determine that the ambient temperature, such as outdoor ambient temperature 197 or indoor ambient temperature, and/or the pressure ratio suggest an opportunity to enhance efficiency. Other operating parameters also may be sensed and used to determine that efficiency can be increased by varying motor torque power when the compressor is operating at a reduced capacity.

In one embodiment, the thermostat 90 may indicate an indoor ambient temperature of about 72° F. and a desired temperature setting of about 70° F. When that is the case, the controller 160 may receive signals representative of one or more other operating parameters that indicate that efficiency may be optimized (or improved) by weakening the torque of the compressor motor 105.

When the controller 160 determines an opportunity to optimize efficiency, the controller 160 may vary at least one of the capacitance or the voltage (step 240). The controller 160 may vary the capacitance by adding or removing capacitance, such as by adding or removing the one or more auxiliary capacitors 181, 182. Furthermore, the controller 160 may vary the voltage by varying the source of line voltage 146. In one embodiment, the controller 160 varies the source of line voltage 146 by adding one or more resistors (e.g., resistor 148 at FIG. 1B) to reduce the voltage provided to the compressor motor 105, which weakens the compressor motor. Alternatively, a rectifier circuit, such as a Silicon Controlled Rectifier (SCR) circuit or TRIAC circuit, may be used to vary the voltage provided by the source of line voltage 146. The SCR circuit and TRIAC circuit are known and are commercially available.

In one embodiment, the controller 160 may receive an indication that the compressor motor 105 is in a first stage of cooling; receive an indication of the environmental conditions; determine that operating efficiency may be optimized; and then vary the capacitance such that the torque provided to the variable capacity compressor varies to satisfy the reduced demand for cooling (step 240). In that embodiment, the controller 160 may reduce the torque provided to the compressor motor 105 by reducing the capacitance. The controller may reduce the capacitance by removing at least one of the auxiliary capacitors 181, 182 connected in parallel with the run capacitor 180. The controller 160 may also provide a control signal on the control lines 192, 193 to open at least one of the relays 165, 170, reducing the overall capacitance. The reduced capacitance may thus reduce (or weaken) the torque provided to the compressor motor 105, causing a more efficient operation of the compressor motor 105.

The controller 160 may continue to operate the compressor motor 105 in a lower first stage of cooling (step 250) with the varied capacitance and/or varied voltage until the controller 160 receives an indication that environmental conditions require a different stage of operation. For example, environmental conditions may prompt the controller 160 to return to full cooling at the second stage (see, e.g., step 205 at FIG. 2) or to operate in heat pump mode providing warm air, as described below with reference to FIG. 3.

Figure 3:
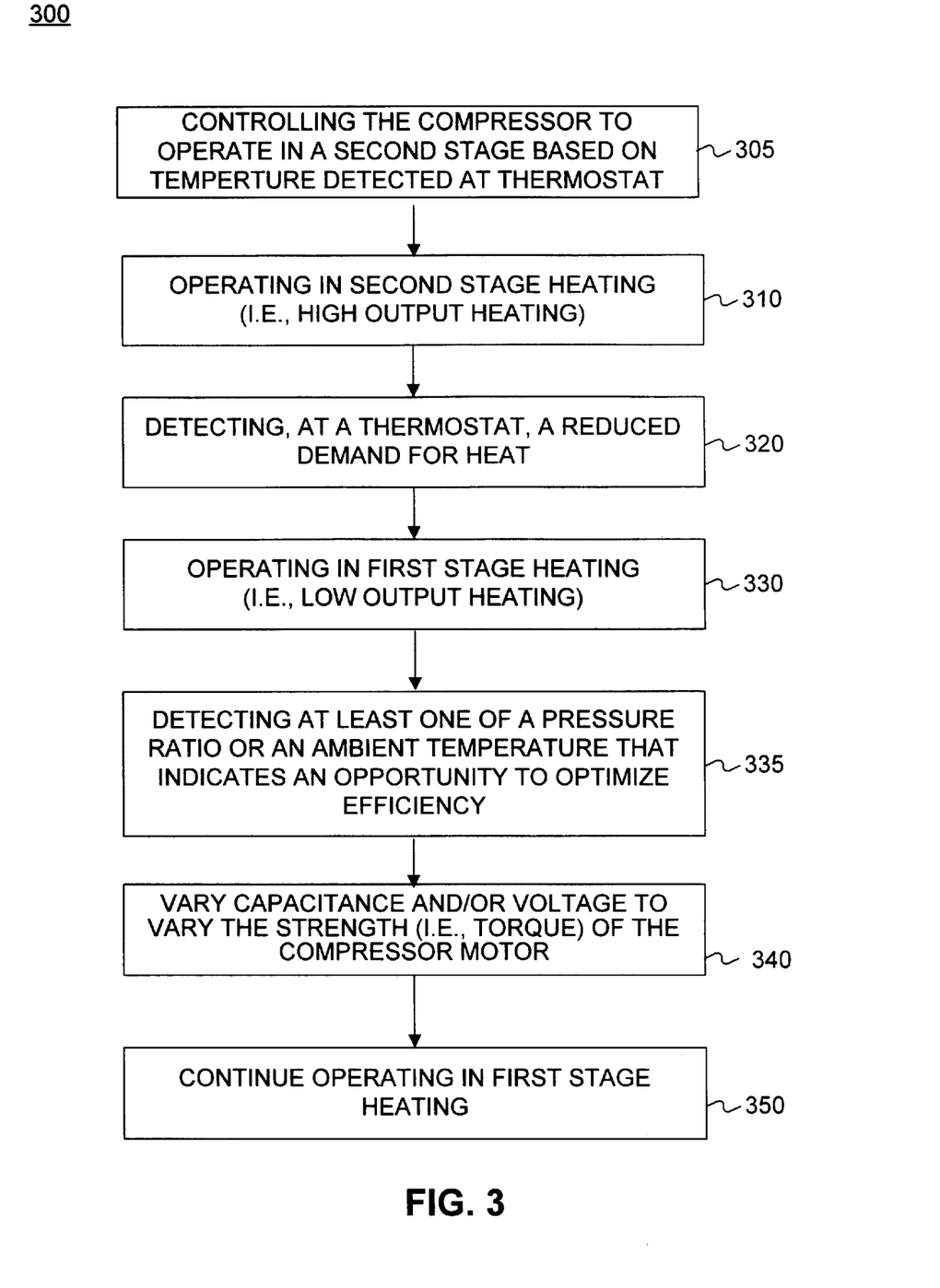
FIG. 3 another exemplary flowchart depicting steps associated with controlling a two-stage reversible compressor that provides warm air in accordance with methods and systems consistent with the present invention.

FIG. 3 shows an exemplary flowchart depicting the steps associated with varying at least one of the capacitance and/or the voltage when the compressor operates in heat pump mode, providing warm air. Referring to FIGS. 1A and 3, the compressor motor 105 may operate as a heat pump. A skilled artisan would recognize that a compressor may operate as a heat pump by using the heat generated at the evaporator coils instead of using the cold condenser coils.

The controller 160 may control compressor 105 to operate in a second stage of heating (or full capacity heating) based on a detected temperature at the thermostat 90 (step 305). The compressor motor 105 may then operate in the second stage of heating (step 310). When the thermostat 90 detects a reduced demand for heating, the controller 160 may detect the reduced demand for heating (step 320); control the compressor motor 105 to run in a lower first stage of heating (step 330); detect at least one of a pressure ratio, an ambient temperature, or another operating parameter, indicating an opportunity to optimize efficiency (step 335); and vary at least one of the capacitance or the voltage (step 340) to adjust (or vary) compressor motor 105 strength. The compressor motor 105 may then continue operating in the first stage of heating (step 350).

To control compressor 105 to operate in a second stage of heating based on a detected temperature at the thermostat 90 (step 305), the controller 160 may receive temperature indications through control line 196 (e.g., an indoor ambient temperature and/or a desired temperature setting). The controller 160 and/or thermostat 90 may control the compressor motor 105 to provide full capacity heating based on such indications. For example, if the thermostat 90 indicates an indoor ambient temperature of about 60° F. and a desired temperature setting of 72° F., the controller 160 may control the compressor 105 to operate in the full capacity second stage.

To operate in a second stage of heating (step 310), the compressor motor 105, as noted above, may operate at a higher capacity, for example, by using two cylinders, providing sufficient refrigerant flow to satisfy the demand for full capacity heating. The controller 160 may provide on control lines 194, 195 control signals that close the first contactor 140 and open the second contactor 141.

To detect the reduced demand for heating (step 320), the controller 160 may recognize a reduced demand for heating.

For example, the controller 160 may receive an indication from a sensor (not shown) that the outdoor temperature 197 has increased to 65° F., reducing the need for heating. Alternatively, the controller 160 may receive indications from the indoor thermostat 90 that the demand for heating has decreased. For example, the thermostat 90 may indicate an indoor ambient temperature of about 72° F. and a desired temperature setting of about 68° F. (or 70° F.), indicating a reduced demand for heating.

When the demand for heating decreases, the compressor motor 105 may operate in a reduced first stage of heating (step 330). To operate in a first stage of heating, the controller 160 may open the first contactor 140 and close the second contactor 141 by providing a control signal on each of the control lines 194, 195.

When the compressor motor 105 operates in a first stage of heating providing reduced capacity heating, the controller 160 may determine an opportunity to enhance operating efficiency (step 335). To determine an opportunity to enhance operating efficiency, the controller 160 may receive at least one of a pressure ratio, an ambient temperature, or other operating parameters that can provide an indication to enhance efficiency (step 335). The controller 160 may then determine that the ambient temperature and/or the pressure ratio (e.g., suction pressure/discharge pressure) suggest an opportunity to improve compressor operating efficiency.

When the controller 160 determines an opportunity to enhance efficiency, the controller 160 may vary at least one of the capacitance or the voltage (step 340). The controller 160 may vary the capacitance by adding or removing capacitance, such as by adding or removing the one or more auxiliary capacitors 181, 182. Furthermore, the controller 160 may vary the voltage by varying the source of line voltage 146.

In one embodiment, the controller 160 may receive an indication that the compressor motor 105 is in a first stage of heating; receive an indication of the environmental conditions, such as an outdoor ambient temperature, outdoor ambient humidity, indoor ambient temperature, or indoor ambient humidity; determine that operating efficiency may be optimized (or enhanced); and then vary the capacitance such that the torque provided to the variable capacity compressor varies to satisfy the reduced demand for heating (step 340). In that embodiment, the controller 160 may reduce the torque provided to the compressor motor 105 by reducing the capacitance. The controller may reduce the capacitance by removing at least one of the auxiliary capacitors 181, 182 connected in parallel with the run capacitor 180. The controller 160 may also provide control signals on the control lines 192, 193 to open at least one of the relays 165, 170. The reduced capacitance may thus reduce the torque provided to the compressor motor 105, enhancing efficient operation of the compressor motor 105.

The controller 160 may continue to operate the compressor motor 105 in the lower first stage of heating (step 350) with the varied capacitance and/or varied voltage until the controller 160 receives an indication that environmental conditions require a different stage of operation (e.g., step 205 at FIG. 2 or step 305 at FIG. 3).

Figure 4A:
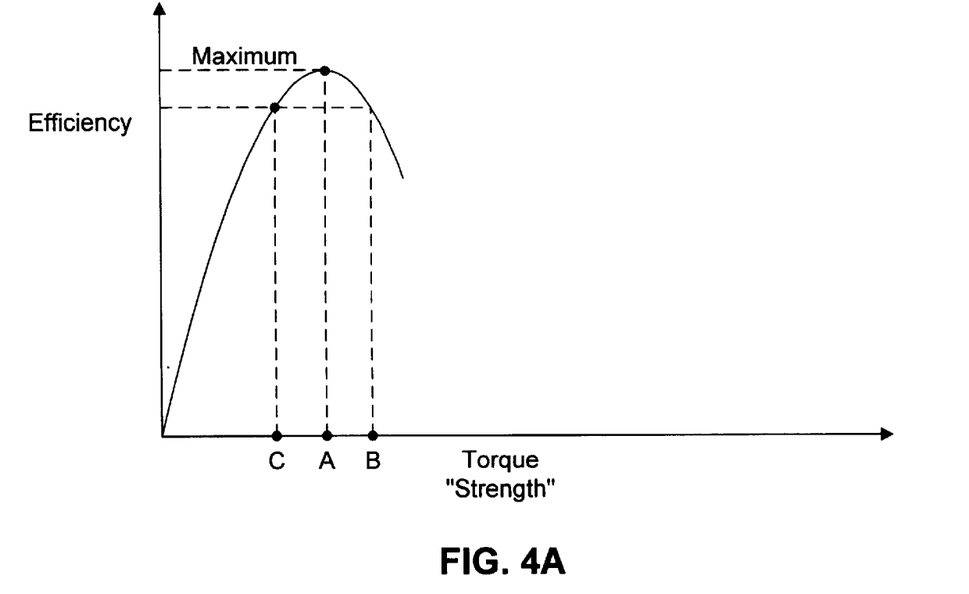
FIG. 4A is an exemplary plot of efficiency versus torque.
Figure 4B:
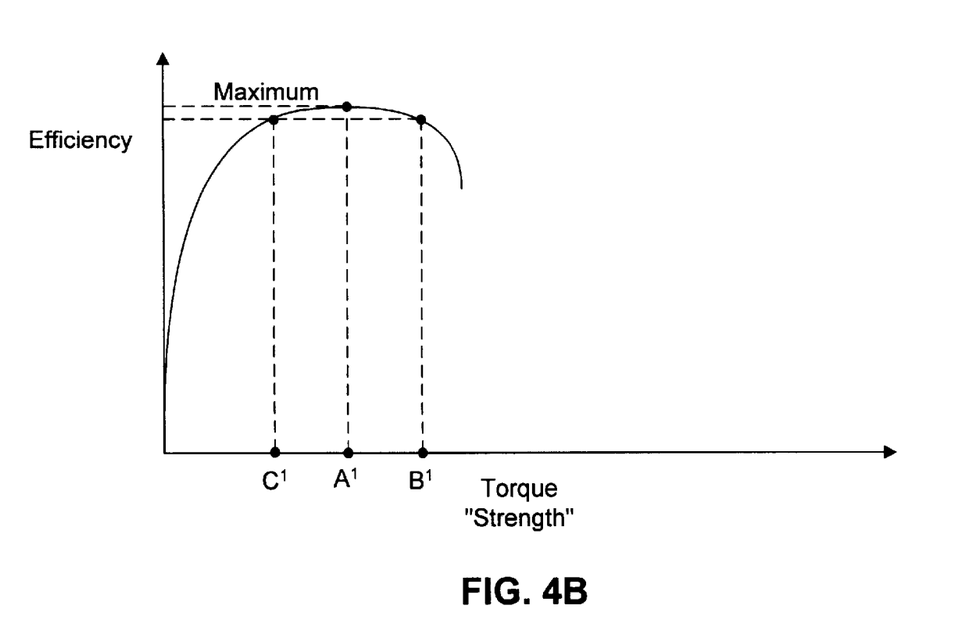
FIG. 4B is an exemplary plot of efficiency versus torque, in accordance with methods and systems consistent with the present invention.

FIGS. 4A and 4B depict exemplary plots of efficiency versus torque. Referring to FIG. 4A, at a specific torque "A" the efficiency of a variable capacity compressor is at a maximum. An increase in torque to "B" may result in a significant decrease in efficiency. Similarly, a decrease in torque to "C" may also results in a significant decrease in efficiency. Such variations in torque may be common for a compressor motor providing torque to a compressor.

On the other hand, FIG. 4B depicts an exemplary plot of a compressor motor using the systems and methods consistent with the present invention. For example, the compressor motor 105 may operate at torque "A$^1$" with a maximum efficiency. When the compressor motor 105 provides less torque to the compressor, such as at torque (see C$^1$), the compressor motor 105 may still operate at nearly a maximum efficiency. Accordingly, by varying the capacitance and/or the voltage such that the torque provided to the variable capacity compressor varies to satisfy the demand for heating or cooling, the efficiency of the compressor motor 105 may be optimized (or enhanced) over a wider range of operation, when compared to past approaches.

In summary, the present invention provides systems and methods to improve the efficiency of a variable capacity compressor by varying the capacity of the compressor to meet load requirements and also may vary the motor torque in response to sensed operating parameters that indicate an opportunity to enhance efficiency by varying the torque. The capacity of the compressor preferably is changed in response to signals from a thermostat or similar control system that indicates the difference between the desired temperature set point of the medium being conditioned (e.g., air or water) and the actual temperature. The capacity of the system is decreased in response to a lower load requirement. The torque applied to the compressor, through the motor, is varied in response to other sensed parameters, such as the one or both of the outdoor air temperature or the pressure ratio of the compressor, to provide improved efficiency. For example, when the compressor is operating at a lower capacity and one or both of these sensed operating parameters indicates an opportunity to improve efficiency at lower capacity operation, the torque applied to the motor is decreased by, for example, lowering the voltage applied to the motor, or the capacitance applied to the motor circuits. Although the above examples are described as applied to a variable capacity reciprocating compressor, the invention can be applied to other variable capacity compressors and/or screw or scroll compressors.

The foregoing description of the invention has been presented for purposes of illustration and description. It is not intended to be exhaustive or to limit the invention to the precise form disclosed, and modifications and variations are possible in light of the above teachings or may be acquired from practice of the invention. For example, the present invention is not limited to the system disclosed, but is capable of being embodied in a variety of ways and services.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for controlling a variable capacity compressor including a start winding and a run winding, comprising:
    a sensor for detecting an indication of a change in the demand for heating or cooling;
    a controller further comprising
        means for operating the variable capacity compressor in one or more stages such that power is provided by the variable capacity compressor to satisfy a demand for heating or cooling, and
        means for operating the variable capacity compressor at a reduced capacity based on the detected change; and
    a first relay and a second relay connected to said controller, such that the first and second relays vary a capacitance connected in parallel with a run capacitor, wherein the torque provided to the variable capacity compressor varies to increase the efficiency of the compressor.

2. A computer readable medium containing computer software, which, when run on a computer causes the computer to provide apparatus for controlling a variable capacity compressor including a start winding and a run winding, the apparatus comprising:
    means for operating the variable capacity compressor in one or more stages such that power is provided by the variable capacity compressor to satisfy a demand for heating or cooling;
    means for detecting a change in the demand for heating or cooling;
    means for operating the variable capacity compressor at a reduced capacity based on the detected change; and
    means for varying one of a voltage applied to the variable capacity compressor or a capacitance connected in parallel with a run capacitor, such that the torque provided to the variable capacity compressor varies to increase the efficiency of the compressor.

3. A system for controlling a variable capacity compressor including a start winding and a run winding, the system comprising:
    at least one memory comprising
        code that operates to control the variable capacity compressor in one or more stages such that power is provided by the variable capacity compressor to satisfy a demand for heating or cooling,
        code that detects a change in the demand for heating or cooling,
        code that operates the variable capacity compressor at a reduced capacity based on the detected change, and
        code that varies a capacitance connected in parallel with a run capacitor, such that the torque provided to the variable capacity compressor varies to increase the efficiency of the compressor; and
    at least one processor that executes said code.

4. A system of controlling a two-stage reversible compressor including a start winding and a run winding, comprising:
    means for operating the variable capacity compressor in one or more stages such that power is provided by the variable capacity compressor to satisfy a demand for heating or cooling;
    means for detecting a change in the demand for heating or cooling;
    means for operating the variable capacity compressor at a reduced capacity based on the detected change; and
    means for varying a capacitance connected in parallel with a run capacitor, such that the torque provided to the variable capacity compressor varies to increase the efficiency of the compressor.

5. A system of controlling a variable capacity compressor including a start winding and a run winding, comprising:
    means for operating the variable capacity compressor in one or more stages such that the power provided by the variable capacity compressor satisfies a demand for heating or cooling;
    means for detecting a change in the demand for heating or cooling;
    means for operating the variable capacity compressor at a reduced capacity based on the detected change; and
    means for varying one of a voltage applied to the variable capacity compressor or a capacitance connected in parallel with a run capacitor, such that the torque provided to the variable capacity compressor varies to increase the efficiency of the compressor.

6. The system of claim 5, wherein the variable capacity compressor is a two-stage, reversible reciprocating compressor.

7. The system of claim 5 further comprising:

means for varying a capacitance connected in parallel with a run capacitor based on at least one of a detected pressure ratio or a temperature.

8. The system of claim 5, wherein said means for varying further comprises:

means for receiving an indication at a controller of the change in the demand for heating or cooling.

9. The system of claim 8 further comprising:

means for providing a control signal to one or more relays based on the received indication of the change in the demand for heating or cooling.

10. The system of claim 9, wherein said means for varying further comprises:

means for varying the voltage applied to the variable capacity compressor by reducing the voltage based on the provided control signal.

11. The system of claim 9, wherein said means for varying further comprises:

means for varying the capacitance by reducing the capacitance connected in parallel with a run capacitor based on the provided control signal, such that the torque provided to the variable capacity compressor decreases to increase the efficiency of the compressor.

12. The system of claim 11, further comprising:

a relay for reducing the capacitance based on a control signal from a controller.

13. A method of controlling a variable capacity compressor driven by a motor comprising the steps of:

operating the variable capacity compressor at a first capacity to satisfy a demand for heating or cooling;

detecting a change in the demand for heating or cooling;

operating the variable capacity compressor at a second, different capacity based on the detected change in demand;

detecting an operating parameter that indicates an opportunity to increase compressor efficiency when the compressor is operating at a given capacity; and varying the torque applied by the motor when the detected operating parameter indicates an opportunity to increase efficiency of the compressor by varying the torque.

14. The method of claim 13, wherein the variable capacity compressor is a two-stage, reversible reciprocating compressor.

15. The method of claim 14, wherein the motor includes a start winding, a run winding, and a run capacitor.

16. The method of claim 15 further comprising the step of:

varying one of a voltage applied to the motor or a capacitance in parallel with the run capacitor.

17. The method of claim 16 further comprising the step of:

varying a capacitance connected in parallel with a run capacitor based on at least one of a detected pressure ratio or outside temperature.

18. The method of claim 17, wherein said step of varying the capacitance further comprises the step of:

removing at least one capacitor based on a control signal from a controller.

19. The method of claim 16 further comprising the step of:

varying the voltage applied to the motor based on at least one of a detected pressure ratio or outside temperature.

20. The method of claim 19 wherein said step of varying the voltage further comprises the step of:

reducing the voltage by about at least 10 percent.

21. The method of claim 19, wherein said step of varying the voltage further comprises:

reducing the voltage by applying one or more resistors to the circuit to the motor.

22. The method of claim 19, wherein said step of varying the voltage further comprises the step of:

varying the voltage when an outside air temperature reaches a predetermined temperature.

23. The method of claim 16 further comprising the step of:

operating the compressor at a lower stage by operating the motor on the start winding.

24. The method of claim 23 further comprising the step of:

reducing the torque supplied by the motor by reducing capacitance.

25. The method of claim 16, wherein said step of varying the capacitance further comprises the step of:

varying the capacitance by about at least 15% based on an indoor temperature.

* * * * *